(12) United States Patent
Otaki et al.

(10) Patent No.: US 10,847,836 B2
(45) Date of Patent: Nov. 24, 2020

(54) METHOD FOR PRODUCING SOLID-STATE SECONDARY BATTERY SYSTEM

(71) Applicant: Toyota Jidosha Kabushiki Kaisha, Toyota (JP)

(72) Inventors: Mitsutoshi Otaki, Susono (JP); Norihiro Ose, Shizuoka-ken (JP); Shigenori Hama, Shizuoka-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 150 days.

(21) Appl. No.: 16/281,390

(22) Filed: Feb. 21, 2019

(65) Prior Publication Data

US 2019/0267667 A1   Aug. 29, 2019

(30) Foreign Application Priority Data

Feb. 23, 2018   (JP) ................. 2018-030435

(51) Int. Cl.
| | |
|---|---|
| *H01M 4/04* | (2006.01) |
| *H01M 10/0562* | (2010.01) |
| *H01M 10/0525* | (2010.01) |
| *H01M 4/66* | (2006.01) |
| *H01M 4/38* | (2006.01) |
| *H01M 10/44* | (2006.01) |
| *H01M 4/134* | (2010.01) |

(52) U.S. Cl.
CPC ....... *H01M 10/0562* (2013.01); *H01M 4/134* (2013.01); *H01M 4/386* (2013.01); *H01M 4/663* (2013.01); *H01M 10/0525* (2013.01); *H01M 10/44* (2013.01)

(58) Field of Classification Search
CPC ...................................................... H01M 4/04
See application file for complete search history.

(56) References Cited

U.S. PATENT DOCUMENTS

2018/0013179 A1*   1/2018   Nomura .............. H02J 7/00716

FOREIGN PATENT DOCUMENTS

| JP | 2014041783 A | 3/2014 |
|---|---|---|
| JP | 2017059534 A | 3/2017 |

* cited by examiner

*Primary Examiner* — Jacob B Marks
(74) *Attorney, Agent, or Firm* — Dinsmore & Shohl LLP

(57) ABSTRACT

A method for producing a solid-state secondary battery system comprising a lithium ion solid-state battery that comprises a cathode, an anode and a solid electrolyte layer disposed between the cathode and the anode, and a controller for controlling charge and discharge voltages of the lithium ion solid-state battery in use, the method comprising: obtaining an anode member from an anode material which contains at least elemental Si particles serving as an anode active material and a fibrous carbon serving as a conductive additive material, and in which the contained fibrous carbon is 4.8 vol % or more, obtaining a battery member by disposing a solid electrolyte member between the anode member and a cathode member and attaching them, and carrying out initial constant current charging on the battery member, at a charge rate of 1.0 C or more, to a voltage higher than a maximum charge voltage controlled by the controller.

3 Claims, 1 Drawing Sheet

METHOD FOR PRODUCING SOLID-STATE SECONDARY BATTERY SYSTEM

CROSS REFERENCE TO RELATED APPLICATIONS

The present application claims priority to Japanese Patent Application No. 2018-030435 filed on Feb. 23, 2018, the entire contents of which are hereby incorporated by reference.

TECHNICAL FIELD

The disclosure relates to a method for producing a solid-state secondary battery system.

BACKGROUND

A Si alloy-based active material that can form an alloy with Li, etc., has a large theoretical capacity per volume, compared to a carbon-based anode active material. Therefore, a lithium ion battery using such a Si alloy-based active material in the anode, has been proposed.

Patent Literature 1 discloses a method for producing an all-solid battery system, the method comprising initially charging an all-solid battery to an initial charge voltage that is higher than the charge/discharge voltage range of the battery in use. In "Examples" in Patent Literature 1, it is described that initial charging was carried out at a charge rate of 0.1 C.

Patent Literature 1: Japanese Patent Application Laid-Open No. 2017-059534

According to the production method disclosed in Patent Literature 1, when the charge rate of the initial charging is low, a capacity retention rate in the case where charge/discharge cycles are repeated, can be increased. However, when the initial charge rate is high, internal resistance is increased when charge/discharge cycles are repeated. Therefore, the production method has a problem in that the initial charging takes a long time, and poor production efficiency is obtained.

SUMMARY

In light of the above circumstance, an object of the disclosed embodiments is to provide a method for producing, with high production efficiency, a solid-state battery system that is excellent in cycle characteristics.

In a first embodiment, there is provided a method for producing a solid-state secondary battery system comprising a lithium ion solid-state battery that comprises a cathode, an anode and a solid electrolyte layer disposed between the cathode and the anode, and a controller for controlling charge and discharge voltages of the lithium ion solid-state battery in use, the method comprising: obtaining an anode member from an anode material which contains at least elemental Si particles serving as an anode active material and a fibrous carbon serving as a conductive additive material, and in which the contained fibrous carbon is 4.8 vol % or more, obtaining a battery member by disposing a solid electrolyte member between the anode member and a cathode member and attaching them, and carrying out initial constant current charging on the battery member, at a charge rate of 1.0 C or more, to a voltage higher than a maximum charge voltage controlled by the controller.

In the carrying out of the initial constant current charging, the charge rate may be 2.0 C or less.

In the obtaining of the anode member, the fibrous carbon contained in the anode material may be 9.2 vol % or less.

According to the disclosed embodiments, a method for producing, with excellent production efficiency, a solid-state secondary battery system can be provided, which is excellent in cycle characteristics even when initial charging is carried out at a high charge rate.

BRIEF DESCRIPTION OF THE DRAWINGS

In the accompanying drawings.

DETAILED DESCRIPTION

Figure 1:
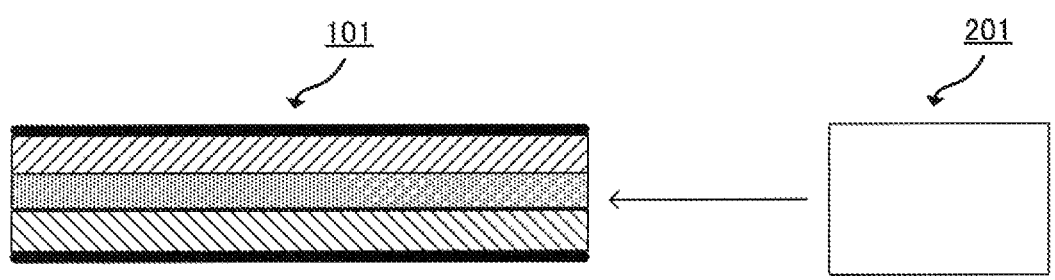
FIG. 1 is a schematic view of a configuration example of a solid-state secondary battery system.

The method for producing the solid-state secondary battery system according to the disclosed embodiments, is a method for producing a solid-state secondary battery system comprising a lithium ion solid-state battery that comprises a cathode, an anode and a solid electrolyte layer disposed between the cathode and the anode, and a controller for controlling charge and discharge voltages of the lithium ion solid-state battery in use, the method comprising: obtaining an anode member from an anode material which contains at least elemental Si particles serving as an anode active material and a fibrous carbon serving as a conductive additive material, and in which the contained fibrous carbon is 4.8 vol % or more, obtaining a battery member by disposing a solid electrolyte member between the anode member and a cathode member and attaching them, and carrying out initial constant current charging on the battery member, at a charge rate of 1.0 C or more, to a voltage higher than a maximum charge voltage controlled by the controller.

In the case of using a Si alloy-based active material as an anode active material, along with charging a lithium ion secondary battery, a so-called electrochemical alloying reaction represented by the following formula (1) occurs in the anode:

$$x\text{Li}^+ + xe^- + y\text{Si} \rightarrow \text{Li}_x\text{Si}_y \qquad \text{Formula (1)}$$

Along with discharging the lithium ion battery, as shown by the following formula (2), an extraction reaction of lithium ions from the Si—Li alloy occurs in the anode:

$$\text{Li}_x\text{Si}_y \rightarrow x\text{Li}^+ + xe^- + y\text{Si} \qquad \text{Formula (2)}$$

The lithium ion secondary battery in which the Si alloy-based active material is used as the anode active material, undergoes a large volume change associated with the Li ion insertion and extraction reactions represented by the formulae (1) and (2). Therefore, cracking or the like occurs in the Si alloy-based active material itself and the anode, and the lithium ion secondary battery has a problem of poor cycle characteristics, accordingly.

In the case of producing an anode by initial charge and discharge reactions represented by the formulae (1) and (2), which are caused by charging an anode member in which a crystalline elemental Si is used as an anode active material, it is known that the crystalline elemental Si is amorphized, and in the Si alloy-based active material of the anode thus produced, charge and discharge reactions proceed preferentially in the amorphized part. In the production method described in Patent Literature 1, the Si alloy-based active material containing more amorphized parts than the anode of a prior-art solid battery, is uniformly increased inside the anode, by initially charging a solid-state battery member at a low charge rate of 0.1 C, to a voltage higher than the maximum charge voltage determined by the solid-state battery system thus obtained. Therefore, the occurrence of cracking in the anode active material, which is associated with Li ion insertion and extraction reactions, and the occurrence of a local volume change, which is caused by the concentration of reaction sites inside the anode, can be suppressed. Therefore, it is thought that the cycle characteristics of the battery can be increased.

However, it was found that the cycle characteristics cannot be increased when the charge rate is increased for high production efficiency in the production method of Patent Literature 1.

During the initial charging, the active material reaction represented by the formula (1) and a Li ion diffusion reaction occur inside the anode member. At a low charge rate of about 0.1 C, the active material reaction is limited. Therefore, it is thought that the active material reaction represented by the formula (1) proceeds in the whole anode. On the other hand, when the charge rate is increased to about 1.0 C, the Li ion diffusion reaction is limited. Therefore, it is thought that the active material reaction represented by the formula (1) locally and preferentially proceeds in a part near the solid electrolyte layer of the anode member, and an area where volume expansion occurs locally in a part near the solid electrolyte layer of the anode member, is formed. It is thought that around the anode active material showing excess volume expansion, when the volume of the anode active material contracts at the time of initial discharging, the conductive additive cannot adapt to the volume contraction, and electron conducting paths from the anode active material are cut.

In the lithium ion secondary battery produced in this manner, charge and discharge reactions are suppressed in the area which is near the solid electrolyte layer of the anode and in which the electron conducting paths are cut, and charge and discharge reactions are promoted in the area which is at a distance in the depth direction from the solid electrolyte layer of the anode. In the area which is at a distance from the solid electrolyte layer of the anode and in which charge and discharge reactions are promoted, there is a large change in the volume of the Si alloy-based active material, along with Li ion insertion and extraction reactions. In the area, as charge/discharge cycles increase, the conductive additive cannot adapt to the volume change of the Si alloy-based active material, gradually, and the electron conducting paths are cut. Therefore, the area in which charge and discharge reactions are promoted, moves to an area which is at more distance in the depth direction from the solid electrolyte layer. As a result, it is thought that the area in which the electron conducting paths are cut, is gradually increased inside the anode by repeating charge and discharge, and the internal resistance of the lithium ion secondary battery is increased, therefore.

In the method for producing the solid-state battery system according to the disclosed embodiments, the anode member is produced by using the anode material in which the fibrous carbon (serving as a conductive additive raw material) is contained in a large amount that is unpredictable in the prior-art so that the fibrous carbon is 4.8 vol % or more. Therefore, even when the initial charge rate is increased at the time of initial discharge, the conductive additive can adapt to the volume change of the Si alloy-based active material, and in the thus-obtained lithium ion secondary battery, Li ion insertion and extraction reactions associated with charge and discharge, proceed in the whole anode. Due to this reason, it is thought that the solid-state secondary battery system obtained by the production method of the disclosed embodiments, can suppress an increase in internal resistance.

Hereinafter, the method for producing the solid-state secondary battery system according to the disclosed embodiments, will be described in detail.

1. Method for Producing Solid-State Secondary Battery System 1-1. Obtaining Anode Member (1) Anode Material In the production method of the disclosed embodiments, the anode member is produced from an anode material which contains at least elemental Si particles serving as an anode active material and a fibrous carbon serving as a conductive additive material, and in which the contained fibrous carbon is 4.8 vol % or more.

As will be described below, the anode can be obtained from the anode member by initially charging and discharging the battery member.

In addition to the elemental Si particles and the fibrous carbon, the anode material may further contain other components such as a solid electrolyte material and a binder, as needed. This is because as long as the anode member is one obtained from an anode material which contains at least elemental Si particles serving as an anode active material and a fibrous carbon serving as a conductive additive material, and in which the contained fibrous carbon is 4.8 vol % or more, even if the anode member contains other components, the conductive additive is not detached from the anode active material in a discharging stage after the initial charging, and the anode member can keep electroconductivity.

Elemental Si Particles

In the production method of the disclosed embodiments, crystalline elemental Si particles are used as the anode active material. As long as the elemental Si particles are crystalline, they may be monocrystalline or polycrystalline. As described above, compared to a carbon-based active material, the Si alloy-based active material is characterized by having a large theoretical capacity per volume and, on the other hand, poor charge/discharge cycle characteristics. In the production method of the disclosed embodiments, due to the use of the anode material in which the contained fibrous carbon is 4.8 vol % or more, a lithium ion secondary battery that is excellent in charge/discharge cycle characteristics, can be efficiently obtained.

The elemental Si particles used are not particularly limited. In some embodiments, the average particle diameter of the particles is from 1 pm to 10 pm, since Li ion insertion and extraction reactions easily occur inside the particles.

The content of the elemental Si particles in the anode material is not particularly limited. In view of a relationship with energy density, the content may be from 20 vol % to 80 vol, or it may be from 40 vol % to 60 vol %.

Fibrous Carbon

In the production method of the disclosed embodiments, the fibrous carbon is used as the conductive additive material. This is because, as described above, as long as the anode member is one obtained from the anode material in which the contained fibrous carbon is 4.8 vol % or more, the conductive additive is not detached from the anode active material in the discharging stage after the initial charging, and the anode member can keep electroconductivity.

As the fibrous carbon, examples include, but are not limited to, at least one selected from the group consisting of carbon nanotube and carbon nanofiber. The carbon nanotube and the carbon nanofiber may be vapor-grown carbon fiber (VGCF).

To make the anode active material and the conductive additive less likely to be detached in the discharging stage after the initial charging, the content of the fibrous carbon in the anode material may be 4.8 vol % or more, or it may be 7.0 vol % or more. To prevent the energy density from being too low, the content of the fibrous carbon in the anode material may be 9.0 vol % or less.

Solid Electrolyte Material

In the production method of the disclosed embodiments, as needed, the anode material may contain a Li ion-conducting solid electrolyte material, in addition to the above components.

The solid electrolyte material is not particularly limited, as long as it is a material that can be used in solid lithium ion secondary batteries. In some embodiments, the solid electrolyte material may include oxide-based amorphous solid electrolyte, sulfide-based amorphous solid electrolyte, crystalline oxides, crystalline nitrides and so on, all of which have high Li ion conductivity.

As the oxide-based amorphous solid electrolyte, examples include, but are not limited to, $Li_2O$—$B_2O_3$—$P_2O_3$ and $Li_2O$—$SiO_2$. As the sulfide-based amorphous solid electrolyte, examples include, but are not limited to, $Li_2S$—$SiS_2$, LiI—$Li_2S$—$P_2S_5$, LiBr—$Li_2S$—$P_2S_5$, LiI—LiBr—$Li_2S$—$P_2S_5$, LiI—$Li_3PO_4$—$P_2S_5$, and $Li_2S$—$P_2S_5$. As the crystalline oxides, crystalline nitrides and so on, examples include, but are not limited to, LiI, $Li_3N$, $Li_5La_3Ta_2O_{12}$, $Li_7La_3Zr_2O_{12}$, $Li_6BaLa_2Ta_2O_{12}$, $Li_3PO_{(4-3/2w)}N_{w(w<1)}$, and $Li_{3.6}Si_{0.6}P_{0.4}O_4$.

The amount of the solid electrolyte in the anode material is not particularly limited. For example, it may be in a range of from 20 vol % to 80 vol %, or it may be in a range of from 40 vol % to 60 vol %.

Binder

The anode material may further contain a binder, as needed.

As the binder, examples include, but are not limited to, polyvinylidene fluoride (PVdF), polytetrafluoroethylene (PTFE), butylene rubber (BR), styrene-butadiene rubber (SBR), polyvinyl butyral (PVB) and acrylic resin. The binder may be polyvinylidene fluoride (PVdF).

The amount of the binder in the anode material is nor particularly limited. For example, it may be in a range of from 0 vol % to 20 vol %, or it may be in a range of from 1 vol % to 10 vol %.

(2) Formation of Anode Member

In the production method of the disclosed embodiments, the method for forming the anode member from the anode material is not particularly limited. This is because as long as the content of the fibrous carbon in the anode material is 4.8 vol % or more, the content of the conductive additive in the thus-formed anode member, is sufficiently large, so that the conductive additive is not detached from the anode active material in the initial discharging, and the anode member can keep electroconductivity. To form the anode member, a raw material for forming the anode member may be used, which is a mixture of the anode material and a component that is removable after forming the anode member, such as a solvent and a binder.

The method for forming the anode member may be, for example, a method for obtaining the anode member by applying a dispersion of the raw material for forming the anode member, which is a mixture of the anode material and a removable solvent, onto the solid electrolyte member, an anode current collector or other support, and drying the applied dispersion.

The anode current collector is not particularly limited. As the anode current collector, examples include, but are not limited to, Cu, copper alloy, and Cu plated with Ni, Cr, C or the like, and Cu on which Ni, Cr, C or the like is deposited.

The anode member may be formed by other methods, such as compression forming of a powder of the anode material. In the case of carrying out compression forming on the powder of the anode material, for example, a press pressure of from about 400 MPa to about 1000 MPa is applied. A roll pressing machine may be used for compression forming. In this case, an applied line pressure may be set to 10 kN/cm to 100 kN/cm.

Also, the anode member may be formed by other methods, such as a method for forming the anode member by carrying out compression forming on a powder of the raw material for forming the anode member, which is a mixture of the anode material and a removable binder, and then sintering the compressed powder, and a method for forming the anode member by applying a dispersion of the raw material for forming the anode member, which is a mixture of the anode material, the removable solvent and the removable binder, on the solid electrolyte member, the anode current collector or other support, drying the applied dispersion, shaping the dried dispersion into the form of the anode member, and then sintering the shaped product for removal of the binder.

The removable binder is a component which is contained in the raw material for forming the anode member and which is removed after forming the anode member other than the anode material. It may be a binder which functions as a binder when forming the anode member and which is decomposed (or volatilized) and removed by sintering in the process of obtaining the anode member, thereby offering the anode member not containing the binder. As the removable binder, examples include, but are not limited to, polyvinyl butyral and acrylic resin.

1-2. Obtaining Battery Member

The production method of the disclosed embodiments comprises obtaining the battery member by disposing a solid electrolyte member between the anode member and a cathode member and attaching them.

Cathode Member

In the production method of the disclosed embodiments, the cathode member is not particularly limited, as long as it functions as the cathode of the lithium ion solid-state battery after charging the battery member. In general, the cathode member contains a Li-containing cathode active material. As needed, it contains other components such as a binder, a solid electrolyte and a conductive additive.

In the disclosed embodiments, the Li-containing cathode active material is not particularly limited, as long as it is an active material containing a Li element. As the cathode active material, a substance which functions as a cathode active material in an electrochemical reaction, in relation to the Si alloy-based active material serving as the anode active material, and which promotes an electrochemical reaction associated with Li ion transfer, can be used without any particular limitation. Also, a substance that has been known as the cathode active material of a lithium ion battery, can be used in the disclosed embodiments.

As the cathode active material, examples include, but are not limited to, lithium cobaltate ($LiCoO_2$), lithium nickelate ($LiNiO_2$), lithium manganate ($LiMn_2O_4$), different element-substituted Li—Mn spinels represented by the following composition formulae: $Li_{1+x}Ni_{1/3}Mn_{1/3}Co_{1/3}O_2$ and $Li_{1+x}Mn_{2-x-y}M_yO_4$ (where M is at least one element selected from Al, Mg, Co, Fe, Ni and Zn), lithium titanate ($Li_xTiO_y$) and lithium metal phosphate ($LiMPO_4$ where M=Fe, Mn, Co, Ni, etc.)

The cathode active material may include a coating layer that contains a substance which has lithium ion conductivity and which is not fluidized even when it is brought into contact with an active material or a solid electrolyte. As the substance, examples include, but are not limited to, $LiNbO_3$, $Li_4Ti_5O_{12}$ and $Li_3PO_4$.

The form of the cathode active material is not particularly limited. It may be a film form or a particulate form.

The amount of the cathode active material in the cathode member is not particularly limited. For example, it may be 60 mass % or more; it may be in a range of from 70 mass % to 95 mass %; or it may be in a range of from 80 mass % to 90 mass %.

The solid electrolyte material used in the cathode member is not particularly limited, as long as it is a material that can be used in lithium ion solid-state batteries. As with the solid electrolyte material used in the anode member, oxide-based amorphous solid electrolyte, sulfide-based amorphous solid electrolyte, and crystalline oxides, crystalline nitrides and so on, all of which have high Li ion conductivity, may be used in some embodiments.

As the materials for the conductive additive and the binder, the same materials as those used in the anode member can be used.

As the method for forming the cathode member, examples include, but are not limited to, the same methods as those provided above as the method for forming the anode member.

The cathode current collector is not particularly limited. As the cathode current collector, examples include, but are not limited to, SUS, Ni, Cr, Au, Pt, Al, Fe, Ti, Zn, these materials which are plated with Ni, Cr, C or the like, and these materials on which Ni, Cr, C or the like is deposited.

Solid Electrolyte Member

Also in the production method of the disclosed embodiments, the solid electrolyte member is not particularly limited, as long as it functions as the solid electrolyte layer of the lithium solid-state battery after charging the battery member. In general, the solid electrolyte member contains a solid electrolyte material. As needed, it contains other components such as a binder.

As the materials for the solid electrolyte and the binder, the same materials as those used in the anode member and the cathode member, can be used.

The amount of the solid electrolyte material in the solid electrolyte member is not particularly limited. For example, it may be 50 mass % or more; it may be in a range of from 70 mass % to 99.99 mass %; or it may be in a range of from 90 mass % to 99.9 mass %.

As the method for forming the solid electrolyte member, for example, a casting method using a solution or dispersion of the solid electrolyte layer material containing the solid electrolyte material and, as needed, other components, can be used.

The solid electrolyte member may be formed by other methods, such as compression forming of a powder of a solid electrolyte layer material containing the solid electrolyte material and, as needed, other components. In the case of carrying out compression forming on the powder of the solid electrolyte layer material, generally, as with the case of compression forming the powder of the anode material, a press pressure of from about 400 MPa to about 1000 MPa is applied. A roll pressing machine may be used for compression forming. In this case, an applied line pressure may be set to 10 kN/cm to 100 kN/cm.

Battery Member

The battery member is an assembly of members (a cathode member-solid electrolyte member-anode member assembly) having the following array structure, for example: the cathode member, the solid electrolyte member and the anode member are arrayed in this order; they are attached directly or via a component composed of other material; and the component composed of other material may be attached to one of or both the opposite side of the position where the solid electrolyte member is present of the cathode member (the outer side of the cathode member) and the opposite side of the position where the solid electrolyte member is present of the anode mixture (the outer side of the anode member).

A component composed of other material may be attached to the battery member, as long as the battery member can be charged in a direction from the cathode member side to the anode member through the solid electrolyte member. For example, a coating film such as $LiNbO_3$, $Li_4Ti_5O_{12}$ and $Li_3PO_4$ may be disposed between the cathode member and the solid electrolyte member. To one of or both the outer side of the cathode member and the outer side of the anode member, for example, a current collector and/or an outer casing may be attached.

Typically, the battery member is an assembly having the following array structure: the cathode member, the anode member and the solid electrolyte member disposed between the cathode member and the anode member are directly attached, and a component composed of other material is not attached to both the outer side of the cathode member and the outer side of the anode member.

The method for producing the battery member is not particularly limited. For example, as described above, the battery member may be produced by forming the anode member and the cathode member on the solid electrolyte member, or it may be produced by disposing the solid electrolyte member between the anode member and cathode member formed on a current collector, and then attaching them while being in this state. When the anode member and the cathode member are formed on a support other than the solid electrolyte member or the current collector, the anode member and the cathode member are removed from the support, and the removed anode member or cathode member is attached onto the solid electrolyte member.

Also, the battery member may be produced as follows: the powder of the anode material is put in a compression cylinder for powder compression forming, and deposited to a uniform thickness to form an anode material powder layer; the powder of the solid electrolyte layer material containing the solid electrolyte powder and, as needed, other components, is put on the anode material powder layer and deposited to a uniform thickness to form a solid electrolyte layer material powder layer; a powder of the cathode material containing the Li-containing cathode active material is put on the solid electrolyte layer material powder layer and deposited to a uniform thickness to form a cathode material powder layer; and then a powder deposit including the three deposited powder layers thus formed, is subjected to compression forming at once, thereby producing the battery member.

1-3. Carrying Out Initial Constant Current Charging

The method for producing the solid-state secondary battery system according to the disclosed embodiments, comprises carrying out initial constant current charging on the battery member, at a charge rate of 1.0 C or more, to a voltage higher than the maximum charge voltage of the battery in use, which is controlled by the controller of the solid-state secondary battery system.

As described above, a solid-state secondary battery system that is excellent in cycle characteristics can be produced by the prior-art production method, when initial charging is carried out at a low charge rate. However, when the charge rate is increased for higher production efficiency, such a solid-state secondary battery system cannot be produced.

In the production method of the disclosed embodiments, the anode member is obtained from the anode material in which the contained fibrous carbon is 4.8 vol % or more; therefore, a solid-state secondary battery system that is excellent in cycle characteristics can be produced, even when initial charging is carried out at a high charge rate.

The production method of the disclosed embodiments is not particularly limited, as long as it comprises carrying out initial constant current charging in the above-specified condition. For example, as long as production efficiency can be increased, constant voltage charging can be carried out after initial constant current charging is carried out in the above-specified condition.

(1) Charge Rate

In the production method of the disclosed embodiments, initial constant current charging is carried out on the battery member at a charge rate of 1.0 C or more.

In the disclosed embodiments, the C rate means the size of current at the time of charging the battery. For example, if the time required for the battery to enter a fully discharged state (SOC 0%) from a fully charged state (SOC 100%) is one hour, then the current value is 1.0 C. The current value is 2.0 C when the time is two hours.

As described above, in the prior-art production method, initial charging at a low charge rate of 0.1 C is needed to obtain a lithium ion solid-state battery that is excellent in cycle characteristics. Therefore, the prior-art production method requires 10 or more hours for initial charging and results in low production efficiency.

In the production method of the disclosed embodiments, initial charging can be carried out by charging the battery member at a charge rate of 1.0 C or more. Therefore, the time required for initial charging can be reduced to one hour, and production efficiency can be increased.

The charge rate can be obtained by using a rated capacity calculated from the maximum charge voltage and minimum discharge voltage of the battery in use, both of which are preset in the controller of the solid-state secondary battery system obtained by the production method of the disclosed embodiments.

Considering the cycle characteristics of the obtained lithium ion secondary battery and production efficiency, the charge rate of initial constant current charging may be 2.0 C or less.

(2) Maximum Initial Charge Voltage

In the production method of the disclosed embodiments, initial constant current charging is carried out on the battery member, to a voltage higher than the charge voltage of the battery in use, which is controlled by the controller of the solid-state secondary battery system obtained by the production method of the disclosed embodiments. By carrying out initial constant current charging to a voltage higher than the charge voltage of the battery in use, the amorphization rate of the elemental Si particles serving as the anode active material, can be increased. Therefore, the thus-obtained battery can suppress that charge and discharge reactions locally proceed inside the Si alloy-based active material particles and inside the anode.

For example, when the charge and discharge voltages of the battery in use, which are controlled by the controller, is 2.5 V or more and 4.4 V or less, the initial charge voltage can be in a range of more than 4.45 V and 5.00 V or less.

1-4. Other Steps

The production method of the disclosed embodiments is not particularly limited, as long as it comprises the above-mentioned steps. The production method of the disclosed embodiments may also comprise other steps. For example, the production method of the disclosed embodiments may comprise applying confining pressure by a jig installed in the battery member. The applied confining pressure may be from 0.1 MPa to 100 MPa, or it may be from 1 MPa to 40 MPa.

2. Solid-State Secondary Battery System

As shown in FIG. 1, the solid-state secondary battery system produced by the production method of the disclosed embodiments, comprises a lithium ion solid-state battery 101 and a controller 201 for controlling the charge and discharge voltages of the lithium ion solid-state battery in use. Hereinafter, the lithium ion solid-state battery and the controller will be described each.

2-1. Lithium Ion Solid-State Battery

Figure 2:
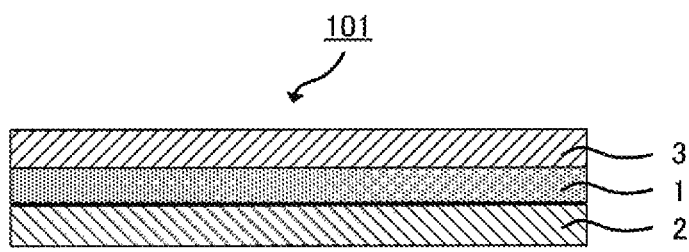
FIG. 2 is a schematic view of a configuration example of a lithium ion solid-state battery.

The lithium ion solid-state battery obtained by the production method of the disclosed embodiments, is not particularly limited, as long as it comprises a cathode, an anode and a solid electrolyte layer disposed between the cathode and the anode, and as long as it functions as a secondary battery. As shown in FIG. 2, typically, the lithium ion solid-state battery comprises a cathode 2, an anode 3, and a solid electrolyte layer 1 disposed between the cathode 2 and the anode 3, and the lithium ion solid-state battery is in the form of a cathode-solid electrolyte layer-anode assembly 101. The cathode-solid electrolyte layer-anode assembly 101 is an assembly of members having the following array structure: the cathode, the solid electrolyte layer and the anode are arrayed in this order; they may be attached directly or via a component composed of other material; and the component composed of other material may be attached to one of or both the opposite side of the position where the solid electrolyte layer is present of the cathode (the outer side of the cathode) and the opposite side of the position where the solid electrolyte layer is present of the anode (the outer side of the anode).

A cell, which is a functional unit of a solid battery, is obtained by attaching other components such as a current collector to the cathode-solid electrolyte layer-anode assembly 101. The cell may be used as it is as the lithium ion solid-state battery, or the cells may be integrated and electrically connected to form a cell assembly used as the lithium ion solid-state battery.

Anode

The anode of the lithium ion solid-state battery obtained by the production method of the disclosed embodiments, contains a Si alloy-based active material serving as an anode active material and a fibrous carbon serving as a conductive additive.

The Si alloy-based active material is an active material containing an elemental Si and a Si—Li alloy. The crystalline elemental Si particles in the anode member are amorphized through initial charging and formed into the Si alloy-based active material.

As described above, the Si alloy-based active material containing many parts amorphized by carrying out initial constant current charging to a voltage higher than the charge voltage of the battery in use, is uniformly increased in the anode. Therefore, local volume expansion and contraction in the anode is suppressed during charge and discharge. Therefore, the cycle characteristics of the battery can be increased.

The amorphization rate of the Si alloy-based active material obtained by the production method of the disclosed embodiments, may be from 27.8% to 82.8%.

The thickness of the anode may be generally from 1 μm to 100 μm, or it may be from 30 μm to 100 μm.

The content ratio of the Si alloy-based active material in the anode is not particularly limited. For example, it may be from 20 vol % to 80 vol %, or it may be in a range of from 40 vol % to 60 vol %.

The content ratio of the fibrous carbon in the anode is not particularly limited, as long as the production condition is satisfied.

As needed, the anode may contain a solid electrolyte. The amount of the solid electrolyte in the anode is not particularly limited. For example, it may be from 20 vol % to 80 vol %, or it may be in a range of from 40 vol % to 60 vol %.

As needed, the anode may be contain a binder. The amount of the binder in the anode is not particularly limited. For example, it may be from 0 vol % to 20 vol %, or it may be in a range of from 1 vol % to 10 vol %.

Cathode

The cathode is not particularly limited, as long as it functions as the cathode of the lithium ion solid-state battery. In general, the cathode contains a Li-containing cathode active material and, as needed, other components such as a binder, a solid electrolyte and a conductive additive.

The amount of the cathode active material in the anode is not particularly limited. For example, it may be 60 mass % or more; it may be in a range of from 70 mass % to 95 mass %; or it may be in a range of from 80 mass % to 90 mass %.

The thickness of the cathode may be generally from about 1 μm to about 100 μm, or it may be from 30 μm to 100 μm.

Solid Electrolyte Layer

The solid electrolyte layer is not particularly limited, as long as it functions as the solid electrolyte layer of the lithium ion solid-state battery. In general, the solid electrolyte layer contains a lithium ion-conducting solid electrolyte. As needed, it contains other components such as a binder.

The amount of the solid electrolyte in the solid electrolyte layer is not particularly limited. For example, it may be 50 mass % or more; it may be in a range of from 70 mass % to 99.99 mass %; or it may be in a range of from 90 mass % to 99.9 mass %.

The thickness of the solid electrolyte layer may be generally from 0.1 μm to 300 μm, or it may be from 0.1 μm to 100 μm.

Others

In addition to the above-mentioned members, the lithium ion solid-state battery obtained by the production method of the disclosed embodiments, may contain other members. As the other members, examples include, but are not limited to, a jig for applying confining pressure to the battery. The applied confining battery may be from 0.1 MPa to 100 MPa, or it may be from 1 MPa to 40 MPa.

2-2. Controller

The controller of the solid-state secondary battery system obtained by the production method of the disclosed embodiments, is not particularly limited, as long as it can control the charge and discharge voltages of the lithium ion solid-state battery in use. For example, the controller may have a function to determine, at the time of discharging the lithium ion solid-state battery, whether the voltage of the lithium ion solid-state battery reached a certain voltage or not, and a function to terminate the discharging when the battery voltage reached the certain voltage. Also, the controller may have a function to determine, at the time of charging the lithium ion solid-state battery, whether the voltage of the lithium ion solid-state battery reached a certain voltage or not, and a function to terminate the charging when the battery voltage reached the certain voltage.

The controller may be a device for controlling the voltage of the lithium ion solid-state battery in use, in a range of 2.50 V or more and 4.40 V or less. This is because when the battery is discharged to a voltage smaller than 2.50 V or to a voltage larger than 4.40 V, the cathode or anode active material may deteriorate and reduce the performance of the battery. The range of the controlled charge and discharge voltages may be 2.60 V or more, 2.70 V or more, 2.90 V or more, 3.00 V or more, 3.10 V or more, or 3.20 V or more, and 4.30 V or less, 4.20 V or less, 4.10 V or less, 4.00 V or less, 3.90 V or less, 3.80 V or less, 3.70 V or less, 3.60 V or less, 3.50 V or less, 3.40 V or less, or 3.30 V or less.

EXAMPLES

1. Production of Battery Member

Example 1

(1) Production of Anode Member

First, 0.621 g of a $Li_2S$—$P_2S_5$-based amorphous solid electrolyte containing LiBr and LiI, which serves a solid electrolyte material, 0.8 g of elemental Si particles having an average particle diameter of 5 μm, which serve as an anode active material, 0.64 g of a 5% by mass solution of PVdF-based resin in butyl acetate, which serves as a binder, and VGCF, which serves as a conductive additive material, were put in a polypropylene container. The VGCF was in such an amount that the volume of the conductive additive material is 4.8 vol % when the total volume of the solid electrolyte material, the anode active material, the binder and the conductive additive material (i.e., the total volume of the anode material) is determined as 100 vol %. The container was subjected to ultrasonic treatment for 30 seconds in an ultrasonic disperser. Then, the container was shaken for 30 minutes with a shaking device, thereby preparing a raw material for forming an anode member.

The thus-prepared raw material for forming the anode member, was applied on a Cu foil, which serves as a current collector, by a blade method using an applicator. The foil was dried on a hot plate at 100° C. for 30 minutes.

(2) Production of Cathode Member

First, 0.269 g of a $Li_2S$—$P_2S_5$-based amorphous solid electrolyte containing LiBr and LiI, which serves as a solid electrolyte material, 1.7 g of $LiNi_{1/3}Co_{1/3}Mn_{1/3}O_2$ particles having an average particle diameter of 6 μm, which serve as a raw material for a cathode active material, 0.255 g of a 5% by mass solution of PVdF-based resin in butyl acetate, which serves as a binder, and VGCF, which serves as a conductive additive, were put in a polypropylene container. The container was subjected to ultrasonic treatment for 30 seconds in the ultrasonic disperser. Then, the container was shaken for 30 minutes with the shaking device, thereby preparing a raw material for forming a cathode member.

The thus-prepared raw material for forming the cathode member, was applied on an Al foil, which serves as a current collector, by the blade method using the applicator. The foil was dried on the hot plate at 100° C. for 30 minutes.

(3) Production of Solid Electrolyte Member

First, 0.6 g of a $Li_2S$—$P_2S_5$-based amorphous solid electrolyte containing LiBr and LiI, which serves as a solid electrolyte material, and 0.48 g of a 5% by mass solution of butylene rubber-based resin in butyl acetate, which serves as a binder, were put in a polypropylene container. The container was subjected to ultrasonic treatment for 30 seconds in the ultrasonic disperser. Then, the container was shaken for 30 minutes with the shaking device, thereby preparing a raw material for forming a solid electrolyte member.

The thus-prepared raw material for forming the solid electrolyte member, was applied on an Al foil, which serves as a substrate, by the blade method using the applicator. The foil was dried on the hot plate at 100° C. for 30 minutes, thereby obtaining the solid electrolyte member. A total of three solid electrolyte members were prepared in this manner.

(4) Production of Battery Member

The anode member obtained in the above (1) and the solid electrolyte member obtained in the above (3) were stacked so that they were in contact with each other, thereby obtaining an anode member-solid electrolyte member-aluminum foil laminate. For the purpose of densification, a pressure of 5 kN/cm was applied to the laminate by a roll pressing machine, in the condition of a roll gap of 100 μm and a feed rate of 0.5 m/min. The aluminum foil used as the substrate of the solid electrolyte member was removed, thereby obtaining an anode member-solid electrolyte member laminate.

The cathode member obtained in the above (2) and the solid electrolyte member obtained in the above (3) were stacked so that they were in contact with each other, thereby obtaining a cathode member-solid electrolyte member-aluminum foil laminate. For the purpose of densification, a pressure of 5 kN/cm was applied to the laminate by the roll pressing machine, in the condition of a roll gap of 100 μm and a feed rate of 0.5 m/min. The aluminum foil used as the substrate of the solid electrolyte member was removed, thereby obtaining a cathode member-solid electrolyte member laminate.

Using a jig, each of the densified current collector-anode mixture-solid electrolyte material part laminate and the densified current collector-cathode mixture-solid electrolyte material part laminate, was cut into the form of a circle.

The anode member-solid electrolyte member laminate cut into the circle form and the solid electrolyte member prepared in the above (3), were further stacked so that the solid electrolytes were in contact with each other. Then, the aluminum foil used as the substrate was removed from the solid electrolyte member prepared in the above (3).

The anode member-solid electrolyte member laminate and the cathode member-solid electrolyte member laminate were stacked so that the cathode member-solid electrolyte member laminate was located at the center of the anode member-solid electrolyte member laminate to which the solid electrolyte member was transferred, and so that the solid electrolytes were in contact with each other. To the laminates stacked in this state, a pressure of 200 MPa was applied for one minute at 130° C., thereby obtaining a battery member comprising the current collectors. A confining pressure of 10 MPa was applied to the battery member by a jig.

(5) Production of Lithium Ion Solid-State Battery

Initial charging of the thus-obtained battery member was carried out by constant current charging at 1.0 C to 4.55 V and then constant voltage charging to a cut-off current of 1/100 C. After the initial charging, initial discharging of the battery was carried out by constant current discharging at 1.0 C to 2.5 V and then constant voltage discharging to a cut-off current of 1/100 C, thereby obtaining the lithium ion solid-state battery of Example 1.

Example 2

The lithium ion solid-state battery of Example 2 was produced in the same manner as Example 1, except that in the initial charging, the constant current charging was carried out at 2.0 C to 4.55 V.

Example 3

The lithium ion solid-state battery of Example 3 was produced in the same manner as Example 1, except that in the production of the anode member, the VGCF (serving as the conductive additive material) was in such an amount that the volume of the conductive additive material is 7.0 vol % when the total volume of the solid electrolyte material, the anode active material, the binder and the conductive additive material (i.e., the total volume of the anode material) is determined as 100 vol %.

Example 4

The lithium ion solid-state battery of Example 4 was produced in the same manner as Example 3, except that in the initial charging, the constant current charging was carried out at 2.0 C to 4.55 V.

Example 5

The lithium ion solid-state battery of Example 5 was produced in the same manner as Example 1, except that in the production of the anode member, the VGCF (serving as the conductive additive material) was in such an amount that the volume of the conductive additive material is 9.2 vol % when the total volume of the solid electrolyte material, the anode active material, the binder and the conductive additive material is determined as 100 vol %.

Example 6

The lithium ion solid-state battery of Example 6 was produced in the same manner as Example 5, except that in the initial charging, the constant current charging was carried out at 2.0 C to 4.55 V.

Comparative Example 1

The lithium ion solid-state battery of Comparative Example 1 was produced in the same manner as Example 1, except the following: (1) in the production of the anode member, the VGCF (serving as the conductive additive material) was in such an amount that the volume of the conductive additive material is 2.5 vol % when the total volume of the solid electrolyte material, the anode active material, the binder and the conductive additive material is determined as 100 vol %, and (2) in the initial charging, the constant current charging was carried out at 0.1 C to 4.55 V.

Comparative Example 2

The lithium ion solid-state battery of Comparative Example 2 was produced in the same manner as Comparative Example 1, except that in the initial charging, the constant current charging was carried out at 1.0 C to 4.55 V.

Comparative Example 3

The lithium ion solid-state battery of Comparative Example 3 was produced in the same manner as Comparative Example 1, except that in the initial charging, the constant current charging was carried out at 2.0 C to 4.55 V.

Comparative Example 4

The lithium ion solid-state battery of Comparative Example 4 was produced in the same manner as Example 1, except that in the initial charging, the constant current charging was carried out at 0.1 C to 4.55 V.

Comparative Example 5

The lithium ion solid-state battery of Comparative Example 5 was produced in the same manner as Example 3, except that in the initial charging, the constant current charging was carried out at 0.1 C to 4.55 V.

Comparative Example 6

The lithium ion solid-state battery of Comparative Example 6 was produced in the same manner as Example 5, except that in the initial charging, the constant current charging was carried out at 0.1 C to 4.55 V.

2. Evaluation of Cycle Characteristics

The lithium ion solid-state batteries of Examples 1 to 6 and Comparative Examples 1 to 6 were evaluated for cycle characteristics, using internal resistance as an indicator.

First, each of the above-obtained lithium ion solid-state batteries of Examples 1 to 6 and Comparative Examples 1 to 6, was charged to a predetermined voltage of 4.17 V in the condition of constant current-constant voltage charging, and then discharged to 3.17 V in the condition of constant current-constant voltage discharging. Then, for each battery, the internal resistance value of the first cycle was obtained. The internal resistance value was obtained by charging each lithium ion solid-state battery at a current density of 17.15 mA/cm$^2$ for 5 seconds and dividing the amount of voltage change ($\Delta V$) during the charging by the current value.

In the same condition as the first cycle, 300 charge/discharge cycles were repeated, and the internal resistance value of the 300th cycle was obtained.

The resistance increase rate was calculated by dividing the internal resistance value of the 300th cycle by the internal resistance value of the first cycle.

3. Results

Tables 1 to 4 show fibrous carbon content (vol %), initial charge rate, and ratio relative to resistance increase rate at 0.1 C.

TABLE 1

|  | Fibrous carbon (Vol %) | Initial charge rate | Ratio relative to resistance increase rate at 0.1 C (Comparative Example 1) |
|---|---|---|---|
| Comparative Example 1 | 2.5 | 0.1 C | 1.00 |
| Comparative Example 2 | 2.5 | 1.0 C | 1.15 |
| Comparative Example 3 | 2.5 | 2.0 C | 1.52 |

TABLE 2

| | Fibrous carbon (Vol %) | Initial charge rate | Ratio relative to resistance increase rate at 0.1 C (Comparative Example 4) |
|---|---|---|---|
| Comparative Example 4 | 4.8 | 0.1 C | 1.00 |
| Example 1 | 4.8 | 1.0 C | 1.05 |
| Example 2 | 4.8 | 2.0 C | 1.09 |

TABLE 3

| | Fibrous carbon (Vol %) | Initial charge rate | Ratio relative to resistance increase rate at 0.1 C (Comparative Example 5) |
|---|---|---|---|
| Comparative Example 5 | 7.0 | 0.1 C | 1.00 |
| Example 3 | 7.0 | 1.0 C | 0.97 |
| Example 4 | 7.0 | 2.0 C | 1.01 |

TABLE 4

| | Fibrous carbon (Vol %) | Initial charge rate | Ratio relative to resistance increase rate at 0.1 C (Comparative Example 6) |
|---|---|---|---|
| Comparative Example 6 | 9.2 | 0.1 C | 1.00 |
| Example 5 | 9.2 | 1.0 C | 0.96 |
| Example 6 | 9.2 | 2.0 C | 1.08 |

As shown in Table 1, for the lithium ion solid-state batteries of Comparative Example 1 to 3 produced by use of the anode material in which the content of the fibrous carbon is 2.5 vol %, the resistance increase rate in the case where the initial charge rate was set to 1.0 C, is 1.15 times the resistance increase rate in the case where the initial charge rate was set to 0.1 C. In the case where the initial charge rate was set to 2.0 C, the resistance increase rate is 1.52 times the resistance increase rate in the case where the initial charge rate was set to 0.1 C. That is, as a result of increasing the initial charge rate for higher production efficiency, the resistance increase rate was also increased.

Meanwhile, as shown in Table 2, for the lithium ion solid-state batteries of Examples 1 and 2 produced by use of the anode material in which the content of the fibrous carbon is 4.8 vol %, the resistance increase rate in the case where the initial charge rate was set to 1.0 C, is 1.05 times the resistance increase rate in the case where the initial charge rate was set to 0.1 C (Comparative Example 4). Even in the case where the initial charge rate was set to 2.0 C, the resistance increase rate is 1.09 times the resistance increase rate in the case where the initial charge rate was set to 0.1 C. Therefore, it was revealed that an increase in the resistance increase rate can be suppressed even when the initial charge rate is increased for higher production efficiency.

As shown in Tables 3 and 4, also for the lithium ion solid-state batteries of Examples 3 to 6 produced by use of the anode material in which the content of the fibrous carbon is 7.0 vol % or 9.2 vol %, it was revealed that an increase in the resistance increase rate can be suppressed even when the initial charge rate is increased for higher production efficiency. Especially for the solid-state batteries of Examples 3 and 6, such a very excellent result was obtained, that in the case where the initial charge rate was set to 1.0 C, the resistance increase rate decreases lower than the resistance increase rate in the case where the initial charge rate was set to 0.1 C.

From the above results, it was revealed that a solid-state lithium ion secondary battery system that is excellent in cycle characteristics, can be efficiently produced by the production method of the present disclosure, the method comprising obtaining an anode member from an anode material which contains at least elemental Si particles serving as an anode active material and a fibrous carbon serving as a conductive additive material, and in which the contained fibrous carbon is 4.8 vol % or more, obtaining a battery member by disposing a solid electrolyte member between the anode member and a cathode member and attaching them, and carrying out initial constant current charging on the battery member, at a charge rate of 1.0 C or more, to a voltage higher than a maximum charge voltage controlled by the controller.

The invention claimed is:

1. A method for producing a solid-state secondary battery system comprising a lithium ion solid-state battery that comprises a cathode, an anode and a solid electrolyte layer disposed between the cathode and the anode, and a controller for controlling charge and discharge voltages of the lithium ion solid-state battery in use, the method comprising:
  obtaining an anode member from an anode material which contains at least elemental Si particles serving as an anode active material and a fibrous carbon serving as a conductive additive material, and in which the contained fibrous carbon is 4.8 vol % or more,
  obtaining a battery member by disposing a solid electrolyte member between the anode member and a cathode member and attaching them, and
  carrying out initial constant current charging on the battery member, at a charge rate of 1.0 C or more, to a voltage higher than a maximum charge voltage controlled by the controller.

2. The method for producing the solid-state secondary battery system according to claim 1, wherein, in the carrying out of the initial constant current charging, the charge rate is 2.0 C or less.

3. The method for producing the solid-state secondary battery system according to claim 1, wherein, in the obtaining of the anode member, the fibrous carbon contained in the anode material is 9.2 vol % or less.

* * * * *

UNITED STATES PATENT AND TRADEMARK OFFICE
CERTIFICATE OF CORRECTION

PATENT NO. : 10,847,836 B2  
APPLICATION NO. : 16/281390  
DATED : November 24, 2020  
INVENTOR(S) : Otaki et al.

Page 1 of 1

It is certified that error appears in the above-identified patent and that said Letters Patent is hereby corrected as shown below:

On the Title Page

Item (71), applicant 1, city, delete "Toyota" and insert --Toyota-shi Aichi-ken--, therefor.

Item (72), inventor 1, city, delete "Susono" and insert --Susono-shi Shizuoka-ken--, therefor.

Item (72), inventor 2, city, delete "Shizuoka-ken" and insert --Sunto-gun Shizuoka-ken--, therefor.

Item (72), inventor 3, city, delete "Shizuoka-ken" and insert --Sunto-gun Shizuoka-ken--, therefor.

Item (73), assignee 1, city, delete "Toyota" and insert --Toyota-shi Aichi-ken--, therefor.

In the Specification

In Column 5, Line(s) 36, after "$Li_2S$-$SiS_2$", insert --$LiI$-$Li_2S$-$SiS_2$--, therefor.

Signed and Sealed this  
Sixth Day of April, 2021

Drew Hirshfeld  
*Performing the Functions and Duties of the*  
*Under Secretary of Commerce for Intellectual Property and*  
*Director of the United States Patent and Trademark Office*